United States Patent
Cogdill et al.

[11] Patent Number: 5,456,784
[45] Date of Patent: Oct. 10, 1995

[54] HOSE CONSTRUCTION AND METHOD OF MAKING THE SAME

[75] Inventors: Bobby J. Cogdill, Waynesville; Richardson J. Trantham, Clyde, both of N.C.

[73] Assignee: Dayco Products, Inc., Dayton, Ohio

[21] Appl. No.: 114,594

[22] Filed: Aug. 31, 1993

[51] Int. Cl.⁶ .................................................. B32B 31/00
[52] U.S. Cl. ........................... 156/229; 156/293; 29/450; 29/DIG. 1; 285/252; 285/253; 285/915
[58] Field of Search .................................. 285/252, 253, 285/915, 23; 24/271, 279; 156/229, 293, 294; 29/450, DIG. 1

[56] References Cited

U.S. PATENT DOCUMENTS

| | | | |
|---|---|---|---|
| 140,830 | 7/1873 | Ingersoll | 285/253 X |
| 3,407,448 | 10/1968 | Tetzlaff et al. | 285/253 X |
| 4,453,289 | 6/1984 | Kleykamp et al. | 24/20 TT |
| 4,732,412 | 3/1988 | van der Linden | 285/915 X |
| 5,002,094 | 3/1991 | Brovont | 285/252 X |
| 5,145,218 | 9/1992 | Worley et al. | 285/243 |
| 5,185,913 | 2/1993 | Campo et al. | 29/453 |
| 5,234,233 | 8/1993 | Fix | 285/252 X |

FOREIGN PATENT DOCUMENTS

| | | | |
|---|---|---|---|
| 3543717 | 6/1987 | Germany | 285/252 |
| 4112274 | 10/1992 | Germany | 285/253 |

Primary Examiner—Dave W. Arola
Attorney, Agent, or Firm—Joseph V. Tassone

[57] ABSTRACT

A hose construction and method of making the same are provided, the hose construction comprising a tubular flexible hose having opposite ends, fastening structure and a clamp fastened to one of the opposite ends of the hose by the fastening structure for substantially circumferentially and radially inwardly clamping the one of the opposite ends of the hose onto a member that has been inserted into the one of the opposite ends of the hose, the fastening structure comprising a tubular arrangement of elastic material disposed in stretched relation over and against part of the clamp and having opposite annular side sections, one of the side sections of the fastening structure having a part thereof disposed outboard of the clamp and having been secured against the one of the opposite ends of the hose to hold the clamp thereon in a predetermined rotational and axial position relative thereto.

9 Claims, 4 Drawing Sheets

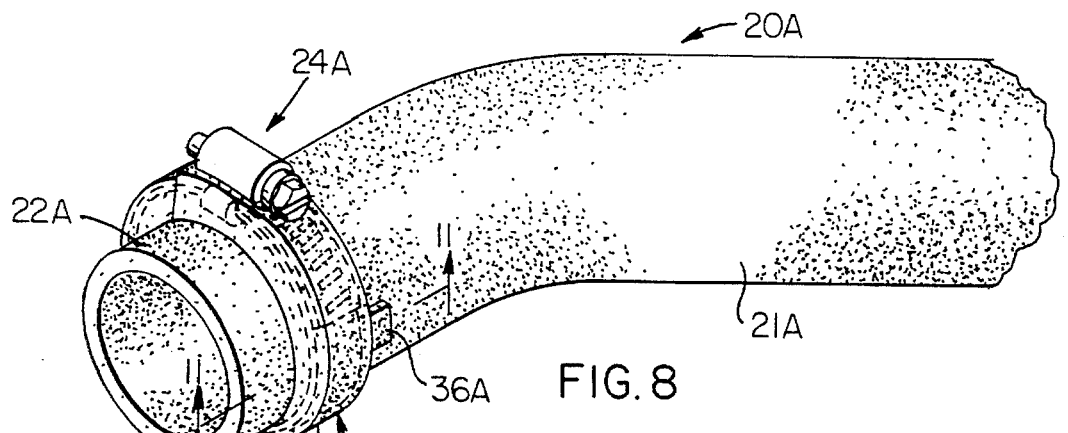
FIG. 8
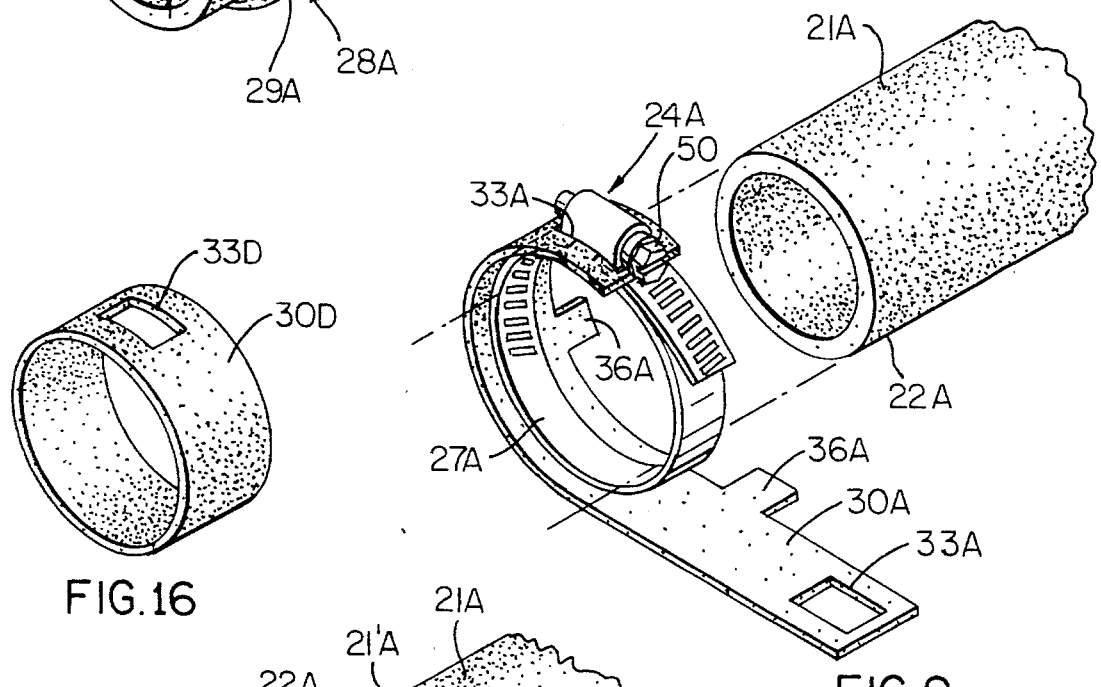
FIG. 16
FIG. 9
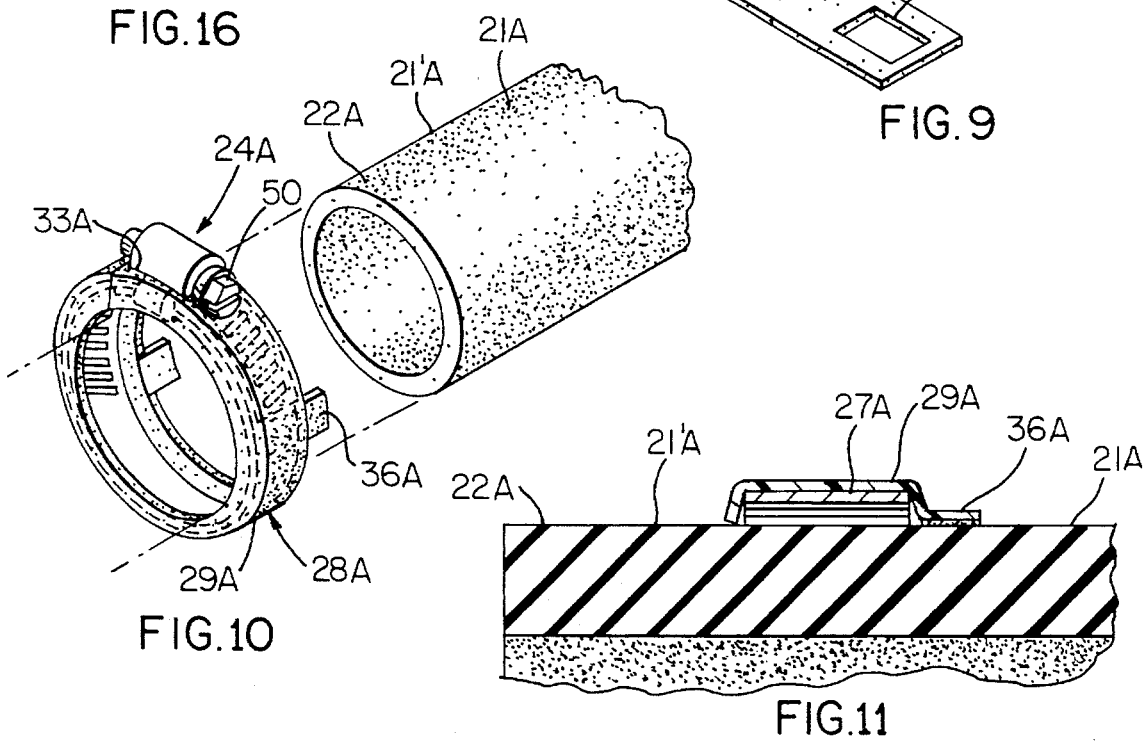
FIG. 10
FIG. 11

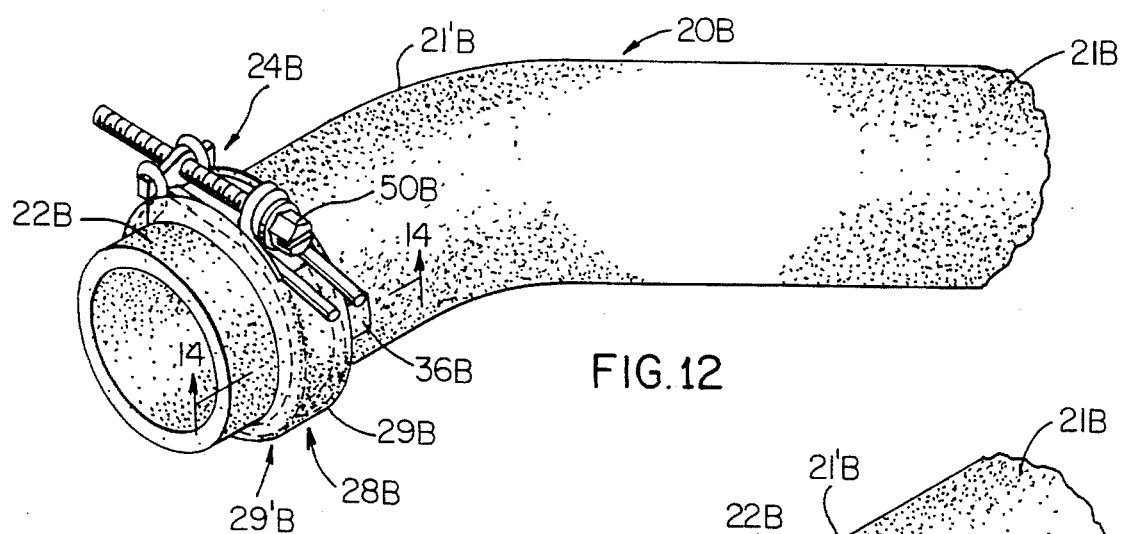
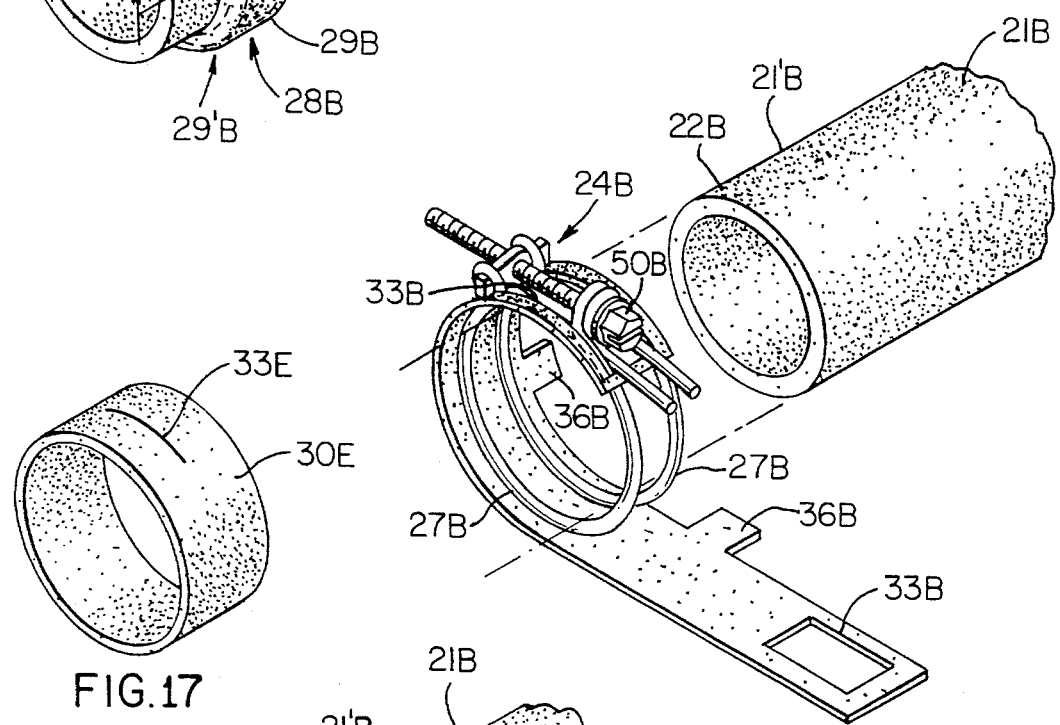
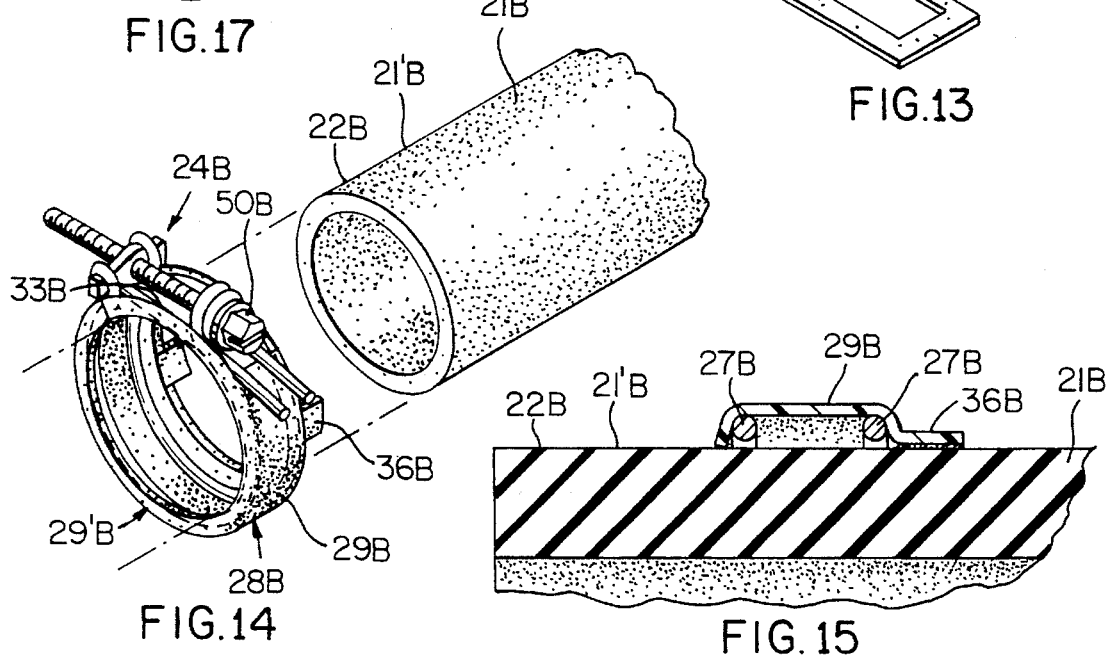

HOSE CONSTRUCTION AND METHOD OF MAKING THE SAME

BACKGROUND OF THE INVENTION

1. Field of the Invention

This invention relates to a new hose construction and to a new method of making the hose construction.

2. Prior Art Statement

It is known to provide a hose construction comprising a tubular flexible hose having opposite ends, fastening means, and a clamping means fastened to one of the opposite ends of the hose by the fastening means for substantially circumferentially and radially inwardly clamping the one of the opposite ends of the hose onto a member that has been inserted into the one of the opposite ends of the hose. For example, see the U.S. patent to Worley et al, U.S. Pat. No. 5,145,218 and the U.S. patent to Campo et al, U.S. Pat. No. 5,185,913.

It is also now known to use a tube of heat shrinkable material as the fastening means and dispose that tube over the clamping means so that subsequent shrinking of that tube will cause annular side sections thereof to engage against the hose and thereby hold the clamping means thereon in a predetermined rotational and axial position relative thereto. For example see the patent application, Ser. No. 068,466, filed May 25, 1993.

It is also known to use a tubular arrangement of elastic material disposed in stretched relation over and against part of the clamping means and having annular side sections disposed against the hose.

Also see the U.S. patent to Kleykamp et al, U.S. Pat. No. 4,453,289 for other fastening means for fastening a clamping means to an end of a flexible hose.

SUMMARY OF THE INVENTION

It is one of the features of this invention to provide a new hose construction wherein the fastening means for fastening a clamping means to one end of a flexible hose can be uniquely and effectively secured thereto in a simple manner.

In particular, it has been found according to the teachings of this invention that when a prior known tube of elastic material is utilized to fasten the clamping means on the end of a flexible hose, the assembly thereof permits the clamping means to rotate on the end of the hose and thereby be out of position for final assembly of the hose in the engine compartment of a vehicle or the like.

However, it was found according to the teachings of this invention that the tube of elastic material can be provided with tab means that can be adhesively secured to the hose to prevent such rotational movement.

For example, one embodiment of this invention comprises a hose construction comprising a tubular flexible hose having opposite ends, fastening means, and a clamping means fastened to one of the opposite ends of the hose by the fastening means for substantially circumferentially and radially inwardly clamping the one of the opposite ends of the hose onto a member that has been inserted into the one of the opposite ends of the hose, the fastening means comprising a tubular arrangement of elastic material disposed in stretched relation over and against part of the clamping means and having opposite annular side sections, one of the side sections of the fastening means having a part thereof disposed outboard of the clamping means and having been secured against the one of the opposite ends of the hose to hold the clamping means thereon in a predetermined rotational and axial position relative thereto.

Accordingly, it is an object of this invention to provide a new hose construction having one or more of the novel features of this invention as set forth above or hereinafter shown or described.

Another object of this invention is to provide a new method of making such a hose construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and where in:

BRIEF DESCRIPTION OF THE DRAWINGS

FIG. 8 is a view similar to FIG. 1 and illustrates another new hose construction of this invention.

FIG. 9 is a fragmentary exploded perspective view of the various parts of the hose construction of FIG. 8.

FIG. 10 is a fragmentary perspective view illustrating how the clamping means and the tubular arrangement of elastic material are assembled together before being assembled as a unit on the end of the flexible hose.

FIG. 11 is an enlarged fragmentary cross-sectional view taken on line 11—11 of FIG. 8.

FIG. 12 is a view similar to FIG. 1 and illustrates another new hose construction of this invention.

FIG. 13 is a fragmentary exploded perspective view of the various parts of the hose construction of FIG. 12.

FIG. 14 is a fragmentary exploded perspective view illustrating how the clamping means and the tubular arrangement of elastic material are assembled together before being assembled as a unit on the end of the flexible hose.

FIG. 15 is an enlarged fragmentary cross-sectional view taken on line 15—15 of FIG. 12.

FIG. 16 is a perspective view of another tube of elastic material of this invention for forming any of the hose constructions of this invention.

FIG. 17 is a perspective view of another tube of elastic material of this invention for forming any of the hose

Figure 1:
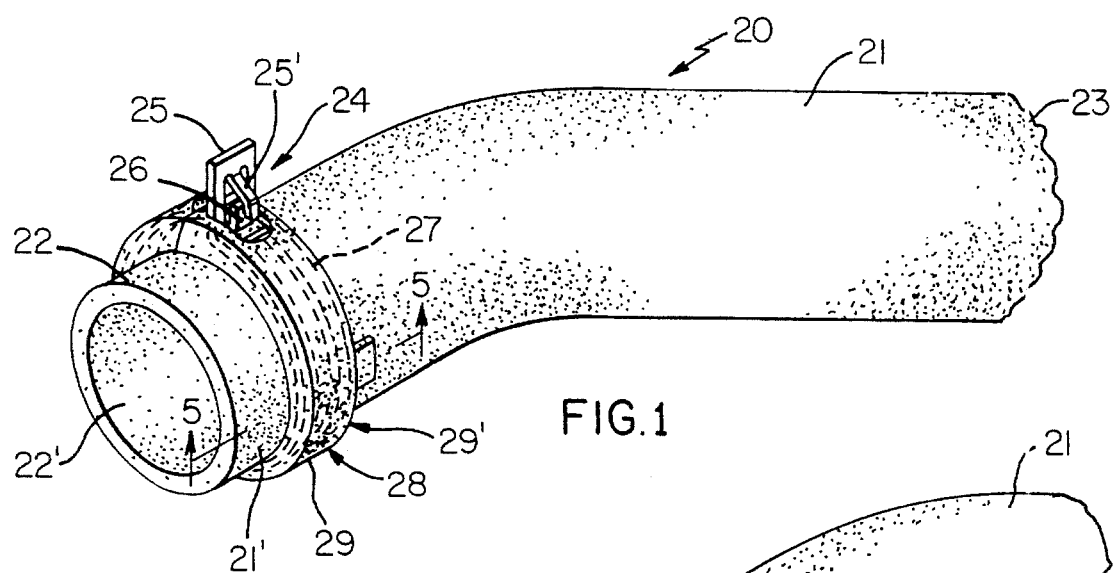
FIG. 1 is a fragmentary perspective view of a new hose construction of this invention.

3 constructions of this invention.

DESCRIPTION OF THE PREFERRED EMBODIMENTS

While the various features of this invention are hereinafter illustrated and described as being particularly adapted to provide a hose construction for a vehicle coolant system, it is to be understood that the various features of this invention can be utilized singly or in various combinations thereof to provide a hose construction for other structures as desired.

Therefore, this invention is not to be limited to only the embodiments illustrated in the drawings, because the drawings are merely utilized to illustrate one of the wide variety of uses of this invention.

Referring now to FIG. 1, the new hose construction of this invention is generally indicated by the reference numeral 20 and comprises a tubular flexible hose 21 having opposite ends 22 and 23, the hose 21 being formed mainly of a suitable polymeric material that is adapted to be utilized as a conduit means in the coolant system of an internal combustion engine (not shown) for a transportation vehicle or the like (not shown). If desired, the flexible tubular hose 21 can be cured in a manner well known in the art so as to have a particular prebent shape so as to be compatible with its positioning in the aforementioned coolant system. For example, see the aforementioned U.S. patent to Worley et al, U.S. Pat. No. 5,145,218, whereby this U.S. patent is being incorporated into this disclosure by this reference thereto. Also see the U.S. patent to Bare, U.S. Pat. No. 3,729,027, whereby this U.S. patent is also being incorporated into this disclosure by this reference thereto.

The hose construction 20 also comprises one or more clamping means, each clamping means being generally indicated by the reference numeral 24. The embodiment of the hose construction 20 illustrated in FIG. 1 has a clamping means 24 for end 22 of the flexible hose 21 with the understanding that the other end 23 could have a like clamping means or a different clamping means carried thereby in a like manner, as desired.

The clamping means 24 is formed of any suitable metallic material that has a natural spring force to tend to circumferentially move apart a pair of end portions 25 and 26 thereof so as to shrink the defining circumference of an annular band 27 thereof from the relatively large circumference defined thereby when the ends 25 and 26 are toggled together in the manner illustrated in FIGS. 1–6 to a smaller circumferential configuration thereof when the end projections 25 and 26 are released from each other so that the clamping means 24 will move to its clamping condition in a manner well known in the art. For example, see the aforementioned U.S. patent to Worley et al, U.S. Pat. No. 5,145,218, as well as the U.S. patent to Muhr, U.S. Pat. No. 4,773,129, and the U.S. patent to Hashimoto et al, U.S. Pat. No. 4,425,682, whereby these last two U.S. patents are also being incorporated into this disclosure by this reference thereto.

Therefore, it can be seen that the upstanding end 26 of the clamping means 24 can be toggled under a tongue 25' of the upstanding end 25 of the clamping means 24 in the manner illustrated in FIGS. 1, 3, 4 and 6 so as to hold the ends 25 and 26 in the clamped-open condition thereof so that the diameter being defined by the band means 27 of the open clamping means 24 is larger than the outside diameter of the end 22 of the hose 21 that is to be subsequently telescoped within the open clamping means 24 in the manner illustrated in FIG. 6 for a purpose hereinafter set forth.

However, when the ends 25 and 26 of the clamping means 24 are untoggled from each other by forcing the end 26 out from under the tang 25' of the end 25, the natural spring force of the clamping means 24 circumferentially spreads apart the end portions 25 and 26 thereof so as to substantially circumferentially and radially inwardly shrink the resulting diameter of the band means 27 so that the clamping means 24, which when disposed about the end 22 of the flexible hose 21, is adapted to cause the end 22 to be substantially circumferentially and radially inwardly compressed or clamped onto an external peripheral surface of a tubular member (not shown) that has been previously inserted into the opening 22' at the end 22 of the hose 21 so as to be fluid sealed and secured thereto and thereby provide a fluid path for the coolant flow of the coolant structure of the internal combustion engine (not shown) for a purpose well known in the art. For example, see the aforementioned U.S. patent to Worley et al, U.S. Pat. No. 5,145,218.

As previously stated, one of the features of this invention is to uniquely fasten the clamping means 24 to the end 22 of the hose 21 so that the clamping means 24 will be carried by the hose construction 20 in the proper location thereon to be subsequently utilized for fastening the end 22 to the desired structure when needed.

In particular, it was found according to the teachings of this invention that the clamping means 24 can be secured to the end 22 of the hose 21 by utilizing a unique fastening means that is generally indicated by the reference numeral 28 and comprising a tubular arrangement 29 of elastic material.

Figures 2, 7:
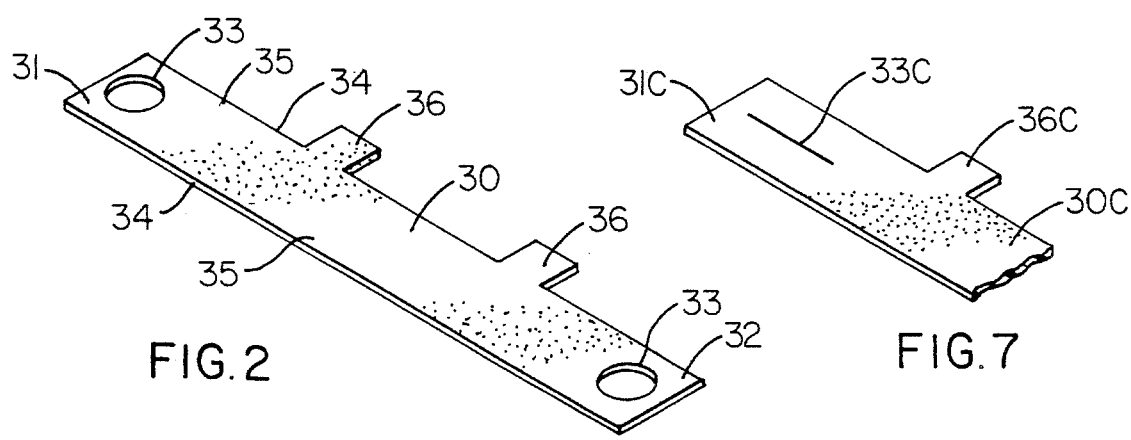
FIG. 2 is a perspective view of a strip of elastic material that subsequently forms a tubular arrangement of elastic material on the clamping means.
FIG. 7 is a view similar to FIG. 2 and illustrates another strip of elastic material that can be used in the same manner as the strip in FIG. 2.

As illustrated in FIG. 2, the annular arrangement 29 is formed from a flat strip 30 of elastic material, such as a rubber material, that is in a generally flat rectangular form and has opposed or opposite ends 31 and 32 respectively provided with opening means 33 therethrough. The strip 30 has opposed parallel side edges 34 defined by parallel side sections 35 that extend between the opposed ends 31 and 32 thereof.

As will be apparent hereinafter, the strip 30 of elastic material has one or more tab means 36 extending outwardly from one of the side edges 34 and being integral and one-piece with the strip 30, the strip 30 illustrated in the drawings having two tabs 36 disposed in spaced apart relation and in predetermined positions relative to the ends 31 and 32 thereof. While each tab means 36 is illustrated as having a substantially rectangular shape, each tab means 36 could have any other suitable configuration, as desired.

The strip 30 has a length between the ends 31 and 32 thereof which is shorter than the circumference of the clamping means 24 when the clamping means 24 is in its expanded condition as illustrated in FIGS. 1 and 2 and the strip 30 is in its unstretched condition.

Figure 3:
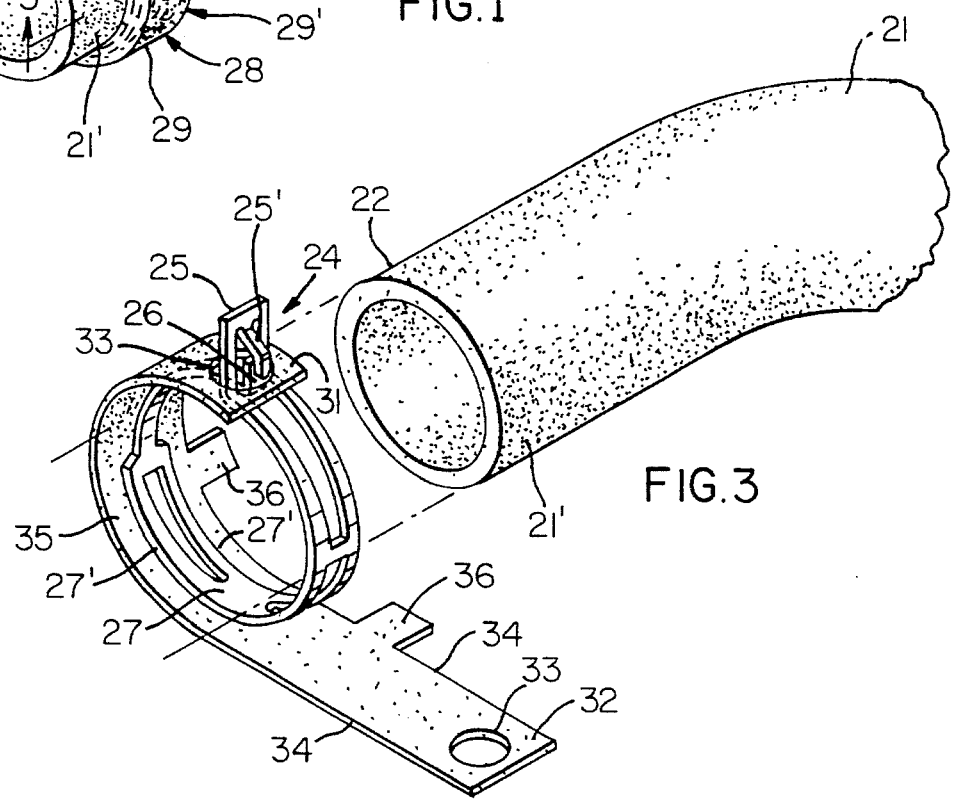
FIG. 3 is an exploded fragmentary perspective view of the various parts of the hose construction of FIG. 1.
Figure 4:
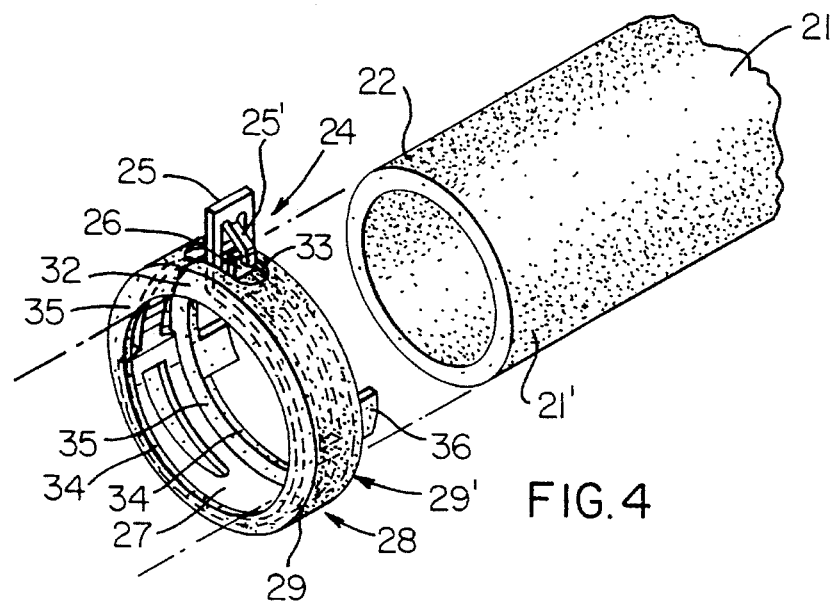
FIG. 4 is a view similar to FIG. 3 and illustrates how the clamping means and the tubular arrangement of elastic material are assembled together before being assembled as a unit on the end of the flexible hose.
Figure 6:
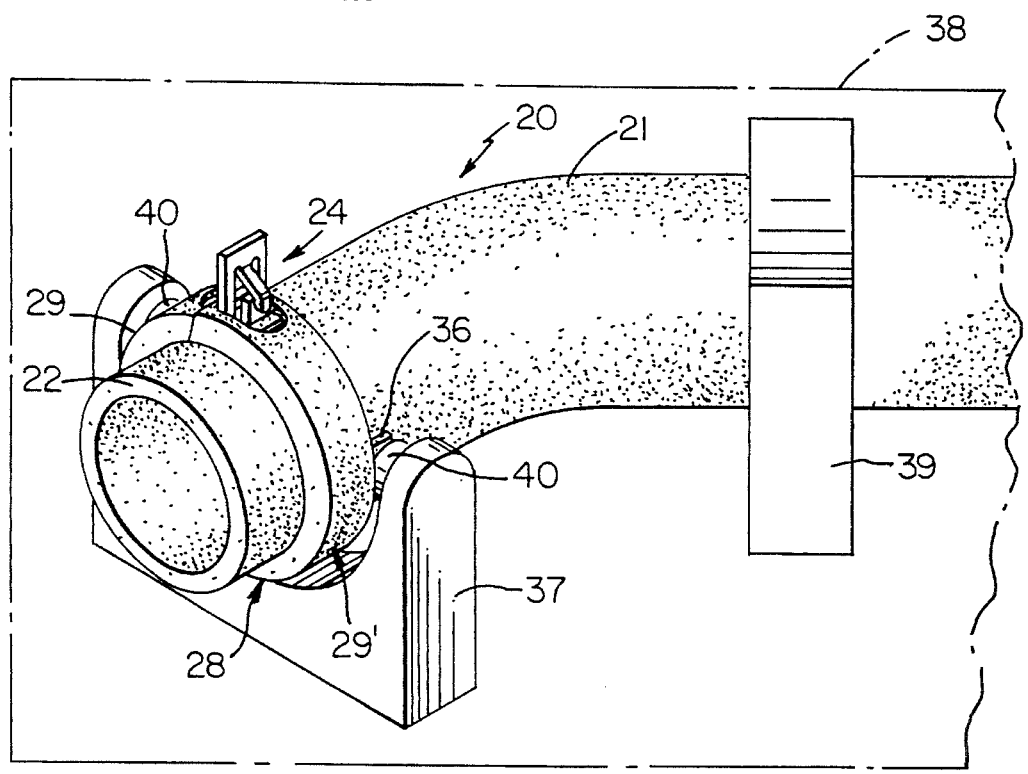
FIG. 6 is a fragmentary perspective view illustrating the apparatus of this invention for forming the hose construction of FIG. 1.
Figure 5:
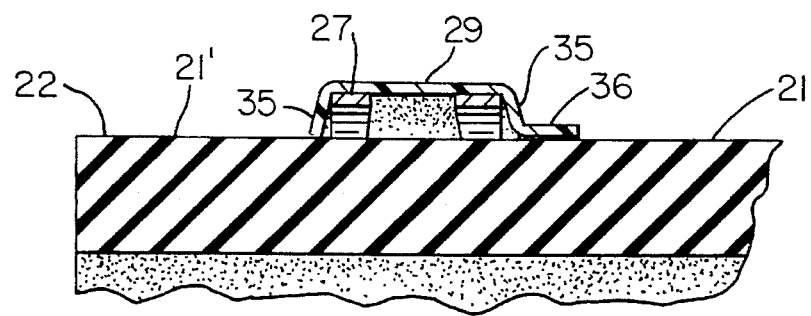
FIG. 5 is an enlarged fragmentary cross-sectional view taken on line 5—5 of FIG. 1.

The strip 30 is assembled with the clamping means 24 by first looping one end, such as the end 31, over the clamping means 24 so that the tower combination of the ends 25 and 26 of the clamping means 24 passes through the opening means 33 as illustrated in FIG. 3 and then the end 32 is brought around to overlap the end 31 by receiving the projecting portions 25 and 26 of the clamping means 24 therein in the manner illustrated in FIG. 4, the strip 30 being required to be stretched between the ends 31 and 32 thereof in order to provide for overlapping the end 32 over the end 31 in the assembled condition illustrated in FIG. 4 whereby it can be seen that the strip 30 now provides an annular structure 29 and is self-contained with the clamping means 24 so as to be telescoped as a unit 29' onto the end 22 of the hose 21 in the manner illustrated in FIG. 6.

Since the strip 30 is in a stretched condition in its annular form on the fastening means 24, the side sections 35 of the strip 30 likewise define annular sections and if the strip 30 is formed with a sufficient width, such side sections 35 extend beyond the opposed side edge means 27' of the annular band 27 of the fastening means 24 so as to extend over the same and radially inwardly grasp the same as illustrated in FIG. 4 because of the stretched condition of the strip 30 to positively hold the annular arrangement 29 in its assembled relation on the clamping means 24.

The side sections 35 of the strip 30 in its annular arrangement 29 may engage the external peripheral surface 21' of the hose 21. However, the width of the strip 30 may be such that the edge means 34 of the side sections 35 do not overlap the external peripheral surface 21' of the hose 21.

In any event, it can be seen that the tab means 36 of the strip 30 have been so sized that the same extend beyond the edge 34 of the strip 30 in its annular arrangement 29 a sufficient distance so as to be disposed against the external peripheral surface 21' of the hose 21 to be fastened thereto with any suitable adhesive means, such as the adhesive means described in the aforementioned patent to Worley et al, U.S. Pat. No. 5,145,218.

Thus, by properly rotationally and axially positioning the clamping means 24 on the end 22 of the hose 21, the tab means 36 can be then secured to the external peripheral surface means 21' of the hose 21 so as to positively hold the clamping means 24 in the predetermined rotational and axial position on the end 22 of the hose 21 for subsequent assembly to the appropriate structure in the engine compartment of a vehicle or the like for the reasons previously set forth.

In fact, the assembled clamping means 24 and tubular arrangement 29 can be disposed as a unit 29' in a fixture 37 of an apparatus 38 of this invention that holds the unit 29' in a desired axial and rotational position so that when the end 22 of the hose 21 is subsequently telescoped within the held tubular arrangement 29 and clamping means 24, another fixture 39 can hold the hose 21 in its proper position so that the projecting portions 25 and 26 of the clamping means 24 will be in a proper rotational and axial position on the hose 21 as provided by the fixtures 37 and 39. Thereafter a suitable adhesive means is used to secure the tab means 36 against the external peripheral surface 21' of the hose 20. Alternately, a suitable pressure activated adhesive means could have been preapplied to the undersurfaces of the tab means 36 so that subsequently parts 40 of the fixture could be extended outwardly to press the tab means 36 against the hose 21 and thereby activate the adhesive means. In any event, the tab means 36 fasten the clamping means 24 in its predetermined position on the end 22 of the hose 21. The hose 21 is then removed from the apparatus 38 and the hose 21 can be attached to the desired structure that is inserted into the opening 22' at the end 22 of the hose 21 by having the clamping means 24 substantially circumferentially and radially inwardly clamp the end 22 thereon when the end 26 is untoggled from the end 25 all in a manner well known in the art.

Therefore, it can be seen that it is a relatively simple method of this invention to make the hose construction 20 of this invention.

While the strip 30 of elastic material for the hose construction 20 can be of any suitable material, one embodiment thereof comprises a blend of approximately 60% isoprene and approximately 40% butadiene. Also, while the strip 30 can have any desired size relative to the clamping means 24 to function in the manner previously set forth, in the one working embodiment thereof, the strip 30 is approximately 7 inches long and approximately 1 inch wide while having a thickness of approximately 0.080 of an inch. However, the strip can be any size, such as having a width between 1 and 2 inches and a thickness between 0.020 and 0.110 of an inch. Each opening 33 in the strip 30 has a diameter of approximately one-half inch.

It is to be understood that the opening means 33 in the strip 30 could take any desired configuration such as oval, elliptical, etc. In fact, the same could each just merely be a single slit through the strip 30.

For example, reference is now made to FIG. 7 wherein another strip of elastic material of this invention is indicated by the reference numeral 30C and parts thereof similar to the strip 30 previously described are indicated by like reference numerals followed by the reference letter "C".

As illustrated in FIG. 7 the strip 30C merely has a single slit 33C formed therethrough at each end thereof and through which the protruding portions 25 and 26 of the clamping means 24 could be forced should such clamping means 24 be utilized with the strip 30C. Of course, other types of clamping means could be utilized with the strip 30, if desired.

For example, the clamping means of FIGS. 8–11 or the clamping means of FIGS. 12–15, as well as other types of clamping means, could be utilized with the strip 30C, if desired.

Also, it is to be understood that the tubular arrangement 29 of this invention can be formed from a continuous band having a single opening therethrough for the protruding part of the clamping means.

For example, reference is now made to FIG. 16 wherein a continuous band of elastic material is indicated by the reference numeral 30D and the same has a single opening 33D therethrough and to FIG. 17 wherein a continuous band of elastic material is indicated by the reference numeral 30E and the same has a single slit 33E therethrough whereby the band 30D or 30E can be stretched over the clamping means 24 and the protruding parts 25 and 26 thereof can project through the opening 33D or 33E thereof.

Another hose construction of this invention is generally indicated by the reference numeral 20A in FIGS. 8–11 and parts thereof similar to the parts of hose construction 20 previously described are indicated by like reference numerals followed by the reference letter "A".

As illustrated in FIGS. 8–11, the hose construction 20A also comprises a flexible hose 21A having an annular clamping means 24A fastened to the external peripheral surface means 21'A of an end 22A thereof by a fastening 28A of this invention that comprises a tubular arrangement 29A of elastic material, the clamping means 24A being of the type that is set forth in the U.S. patent to Dooley, U.S. Pat. No. 4,763,695 whereby this U.S. patent is being incorporated into this disclosure by this reference thereto.

Therefore, it can be seen that it is well known that the clamping means 24A is adapted to have the annular band 27A thereof substantially circumferentially and radially inwardly shrunk around the end 22A of the hose 21A by turning a threaded fastening member 50 of the clamping means 24A in the proper direction for fastening the end 22A of the hose 21A onto a desired tubular structure that has been inserted in the opening 22'A in a manner well known in the art. Of course, the annular band 27A can be circumferentially enlarged by turning the threaded fastening member 50 in the opposite direction in order to remove the previously changed end 22'A.

The opening means 33A in the strip 30A of elastic material is so formed that the same will permit the fastening means 50 to project therethrough in the manner illustrated in FIGS. 8–10 when the clamping means 24A is assembled with the strip 30A for the reasons previously set forth whereby the assembled tubular arrangement 29A and clamping means 24A can be telescoped as a unit on the end 22A of the flexible hose 21A to thereafter permit the tab means 36A to be secured to the hose 21A to positively secure the clamping means 24A in a predetermined position on the end 22A of the hose 21A in the same manner as the tubular arrangement 29 previously set forth.

Another hose construction of this invention is generally indicated by the reference numeral 20B in FIGS. 12–15 and parts thereof similar to the parts of the hose constructions 20 and 20A previously described are indicated by like reference numerals followed by the reference letter "B".

As illustrated in FIGS. 12–15, the hose construction 20B also comprises a flexible hose 21B having an annular clamping means 24B fastened to the external peripheral surface means 21'B of an end 22B thereof by a fastening means 28B of this invention that comprises a tubular arrangement 29B of elastic material formed in the manner previously described.

The clamping means 24B is of the type that is set forth in the U.S. patent to Proctor et al, U.S. Pat. No. 4,592,976, whereby this patent is being incorporated into this disclosure by this reference thereto, such clamping member also being shown in the U.S. patent to Denyes, U.S. Pat. No. 3,365,218, and being illustrated in FIG. 10 thereof in its clamping condition for clamping an end of a hose onto a tubular member inserted therein whereby this U.S. patent is also being incorporated into this disclosure by this reference thereto.

Therefore, since the structure and operation of the annular clamping means 24B is well known in the art, only the details thereof that are necessary to understand the features of this invention will now be set forth.

As illustrated in the drawings, the annular clamping means 24B includes a pair of spaced apart parallel and substantially circular rod-like members 27B that are adapted to be circumferentially enlarged or contracted upon the rotation of a threaded fastening member 50B in the proper direction thereof.

The opening means 33B in the tubular arrangement 29B is formed of a size that is sufficient to permit the threaded fastening member 50B and the encircling parts of the annular bands 27B to protrude therethrough in the manner illustrated in FIGS. 12–14 so that the annular clamping means 24B and tubular arrangement 29B can be assembled together as a unit 29'B as illustrated in FIG. 14 to be subsequently telescoped on the end 22B of the flexible hose 21B to have the tubular arrangement 29B subsequently secured thereon by the tab means 36B in the manner illustrated in FIG. 12 and in the manner previously set forth to secure the clamping means 24B in a predetermined position on the end 22B of the hose 21B whereby the clamping means 24B can subsequently clamp the end 22B onto a member inserted into the opening 21'B of the end 22B of the hose 21B when the fastening member 50B is rotated in the proper direction.

Therefore, it can be seen that the tubular arrangement 29, 29A or 29B of this invention is formed of a size relative to its particular clamping means 24, 24A or 24B so that the tab means 36, 36A or 36B thereof respectively extend outboard of the annular band means 27, 27A or 27B of the respective clamping means 24, 24A or 24B to be substantially adhesively secured against the external peripheral surface means 21', 21'A or 21'B of the flexible hose 21, 21A or 21B to fasten the respective clamping means 24, 24A or 24B in a predetermined position on the end 122, 22A or 22B of the respective flexible hose 21, 21A or 21B in a unique manner and still permits the clamping means 24, 24A or 24B to be closed or opened by a person operating the exposed parts 25, 26, 50 or 50B thereof.

Therefore, it can be seen that this invention not only provides a new hose construction, but also this invention provides a new method of making such a hose construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a hose construction comprising a tubular flexible hose having opposite ends, fastening means, and a clamping means fastened to one of said opposite ends of said hose by said fastening means for substantially circumferentially and radially inwardly clamping said one of said opposite ends of said hose onto a member that has been inserted into said one of said opposite ends of said hose, said fastening means comprising a tubular arrangement of elastic material disposed in stretched relation over and against part of said clamping means and having opposite annular side sections, the improvement comprising the steps of forming one of said side sections of said fastening means to have a plurality of spaced apart tabs disposed outboard of said clamping means, assembling said clamping means and said tubular arrangement of elastic material together as a unit, disposing said unit in a fixture so that said tabs are axially and rotationally oriented relative to said fixture, then inserting said one of said opposite ends of said hose into said oriented unit so as to be in a predetermined position relative to said oriented unit, and then securing said tabs of said tubular arrangement of elastic material to said hose while said unit is in said oriented position thereof and while said one of said opposite ends of said hose is in said predetermined position thereof.

2. A method as set forth in claim 1 and comprising the steps of forming said tubular arrangement of elastic material with an opening means therethrough intermediate said opposite annular side section thereof, and assembling said clamping means and said tubular arrangement of elastic material together to form said unit by disposing a remaining part of said clamping means through said opening means so as to be exposed beyond the exterior of said tubular arrangement of elastic material.

3. A method as set forth in claim 2 wherein said remaining part of said clamping means comprises means for substantially circumferentially and radially inwardly collapsing said clamping means.

4. A method as set forth in claim 2 and comprising the step of forming said opening means to comprise rectangular slot means through said tubular arrangement of elastic material.

5. A method as set forth in claim 2 and comprising the step of forming said opening means to comprise slit means through said tubular arrangement of elastic material.

6. A method as set forth in claim 2 and comprising the steps of forming said tubular arrangement of elastic material to comprise a single strip having opposite ends each having an opening therethrough, and assembling said clamping means and said tubular arrangement together to form said unit by looping said strip around said clamping means with said opposite ends in overlapping relation so as to align said openings thereof and through which said remaining part of said clamping means extends whereby said openings of said strip comprise said opening means.

7. A method as set forth in claim 2 and comprising the step of forming said tubular arrangement of elastic material to comprise a single continuous annular band having a single opening therethrough that comprises said opening means.

8. A method as set forth in claim 1 wherein said tabs of said tubular arrangement are secured to said hose with adhesive means.

9. A method as set forth in claim 1 and comprising the step of forming said tubular arrangement of elastic material to have an inside diameter that is smaller than the outside diameter of said one of said opposite ends of said hose before said tubular arrangement of elastic material is stretched over said clamping means to form said unit.

* * * * *